(12) United States Patent
Dagate (10) Patent No.: US 6,838,884 B1
(45) Date of Patent: Jan. 4, 2005

(54) TIMING OUTPUT PANEL

(75) Inventor: Lawrence N. Dagate, Dallas, TX (US)

(73) Assignee: WorldCom, Inc., Jackson, MS (US)

( * ) Notice: Subject to any disclaimer, the term of this patent is extended or adjusted under 35 U.S.C. 154(b) by 69 days.

(21) Appl. No.: 10/020,893

(22) Filed: Dec. 19, 2001

Related U.S. Application Data

(60) Provisional application No. 60/292,549, filed on May 22, 2001.

(51) Int. Cl.[7] .......................... H01H 31/04; H04L 12/28
(52) U.S. Cl. ...................................... 324/538; 370/423
(58) Field of Search ............................... 324/538, 539, 324/66; 370/400, 423, 351, 438, 422, 424, 395.51, 395.52, 395.53; 379/25, 26.01, 1.01

(56) References Cited

U.S. PATENT DOCUMENTS

| | | | |
|---|---|---|---|
| 4,451,916 A | 5/1984 | Casper et al. ................... | 714/4 |
| 5,552,962 A | 9/1996 | Feustel et al. ............... | 361/733 |
| 5,997,311 A * | 12/1999 | Crouse et al. ................ | 439/49 |
| 6,078,595 A * | 6/2000 | Jones et al. .................. | 370/503 |
| 6,356,532 B1 * | 3/2002 | Richardson et al. ......... | 370/248 |
| 6,371,780 B1 | 4/2002 | Aponte et al. ............... | 439/188 |
| 6,453,014 B1 * | 9/2002 | Jacobson et al. ......... | 379/26.01 |
| 6,512,378 B2 | 1/2003 | Fernandez ................... | 324/539 |
| 6,657,437 B1 | 12/2003 | LeCroy et al. .............. | 324/534 |

* cited by examiner

*Primary Examiner*—N. Le
*Assistant Examiner*—Donald M Lair (57) ABSTRACT

A timing output panel may include a rear portion and a front portion. The rear portion may include a number of network connectors respectively configured to connect to a number of network elements, and at least one timing connector connected to the number of network connectors and configured to connect to synchronization electronics. The front portion may include a number of equipment jacks corresponding to and electrically connected to the number of network connectors. The equipment jacks may facilitate temporary connection of cables for testing or patching signals to the network elements. The front portion also may include a number of timing jacks corresponding to and electrically connected to the at least one timing connector. The timing jacks may facilitate temporary connection of cables for testing the synchronization electronics or patching to the equipment jacks.

20 Claims, 5 Drawing Sheets

Fig. 1

Fig. 2A
(front view)

Fig. 2B
(rear view)

Fig. 2C
(front view)

Fig. 3A
(front view)

Fig. 3B
(rear view)

Fig. 4

TIMING OUTPUT PANEL

RELATED APPLICATIONS

This application claims priority under 35 U.S.C. §119(e) based on U.S. provisional application Ser. No. 60/292,549, filed May 22, 2001, the entire contents of which are incorporated herein by reference.

This application is also related to the following commonly assigned, co-pending application entitled "Timing Return Panel", Ser. No. 10/020,890, filed Dec. 19, 2001, the entire contents of which are incorporated herein by reference.

BACKGROUND OF THE INVENTION

1. Field of the Invention

The present invention relates generally to signal routing and, more particularly, to apparatuses for routing signals among network elements.

2. Description of Related Art

In telecommunications, signal timing may be required to be synchronized among a large number of different network elements. For example, the network elements may include communication interfaces (e.g., synchronous optical network (SONET), Ethernet, asynchronous transfer mode (ATM) or similar interfaces). On a terminating end of these different interfaces, interface electronics typically provide large numbers of reference timing signals and accept large numbers of timing input signals. The reference timing signals from the interface electronics are typically routed to a timing signal generator, which uses one or more of the reference timing signals as a basis for generation of standard timing signals. The timing signal generator may generate the large number of timing output signals from the reference input signals.

The timing output signals and the input reference signals (which may collectively be referred to as "synchronization signals") are typically routed between the interface electronics and the timing signal generator using one or more panels of electrical connectors.

Conventional panels that are used to distribute and terminate synchronization signals from network elements require a substantial amount of cross-connecting to distribute the signals. This cross-connecting typically involves manual wire wrapping and introduces human error in the system. As a result, the available capacity of these panels may not be fully utilized due to the high volume of cables that must be run in each panel. Additionally, conventional panels require a substantial amount of rack space and floor space. Other panel configurations do not provide any capability for termination of return timing signals from interface electronics.

Thus, there is a need in the art to more efficiently implement panels for routing signals among network elements.

SUMMARY OF THE INVENTION

Systems and apparatuses consistent with the principles of the invention, among other things, facilitate permanent and temporary connections between a number of network elements and synchronization electronics. Output panels consistent with the present invention may also facilitate monitoring, testing, and restoring service to the network systems.

In accordance with one implementation of the invention as embodied and broadly described herein, a panel may have a first side and a second side opposite from the first side. The first side may include at least one first connector configured to connect to electrical equipment and receive a number of signals from the electrical equipment. The first side also may include a number of second connectors respectively configured to connect to a number of network devices and deliver the number of signals to the number of network devices. The second side may include a number of third connectors respectively coupled to at least one of the at least one first connector and the number of second connectors. The third connectors may be configured to provide temporary connection to at least one of the electrical equipment and the number of network devices.

In another implementation consistent with principles of the invention, a timing output panel may include a rear portion and a front portion. The rear portion may include a number of network connectors respectively configured to connect to a number of network elements, and at least one timing connector connected to the number of network connectors and configured to connect to synchronization electronics. The front portion may include a number of equipment jacks corresponding to and electrically connected to the number of network connectors. The equipment jacks may facilitate temporary connection of cables for testing or patching signals to the network elements. The front portion also may include a number of timing jacks corresponding to and electrically connected to the at least one timing connector. The timing jacks may facilitate temporary connection of cables for testing the synchronization electronics or patching to the equipment jacks.

In a further implementation consistent with principles of the invention, a system may include a number of network elements, each network element respectively receiving an input timing signal. The system may also include a timing signal generator configured to generate the output timing signals for the number of network elements. A timing output panel may be connected between the number of network elements and the timing signal generator. The timing output panel may include at least one first connector configured to receive the output timing signals from the timing signal generator, and a number of second connectors configured to send the output timing signals to the number of network elements. The timing output panel also may include a number of third connectors spaced remotely from the first and second connectors and configured to facilitate testing of the output timing signals and patching of the output timing signals.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

SYSTEM DESCRIPTION

Figure 1:
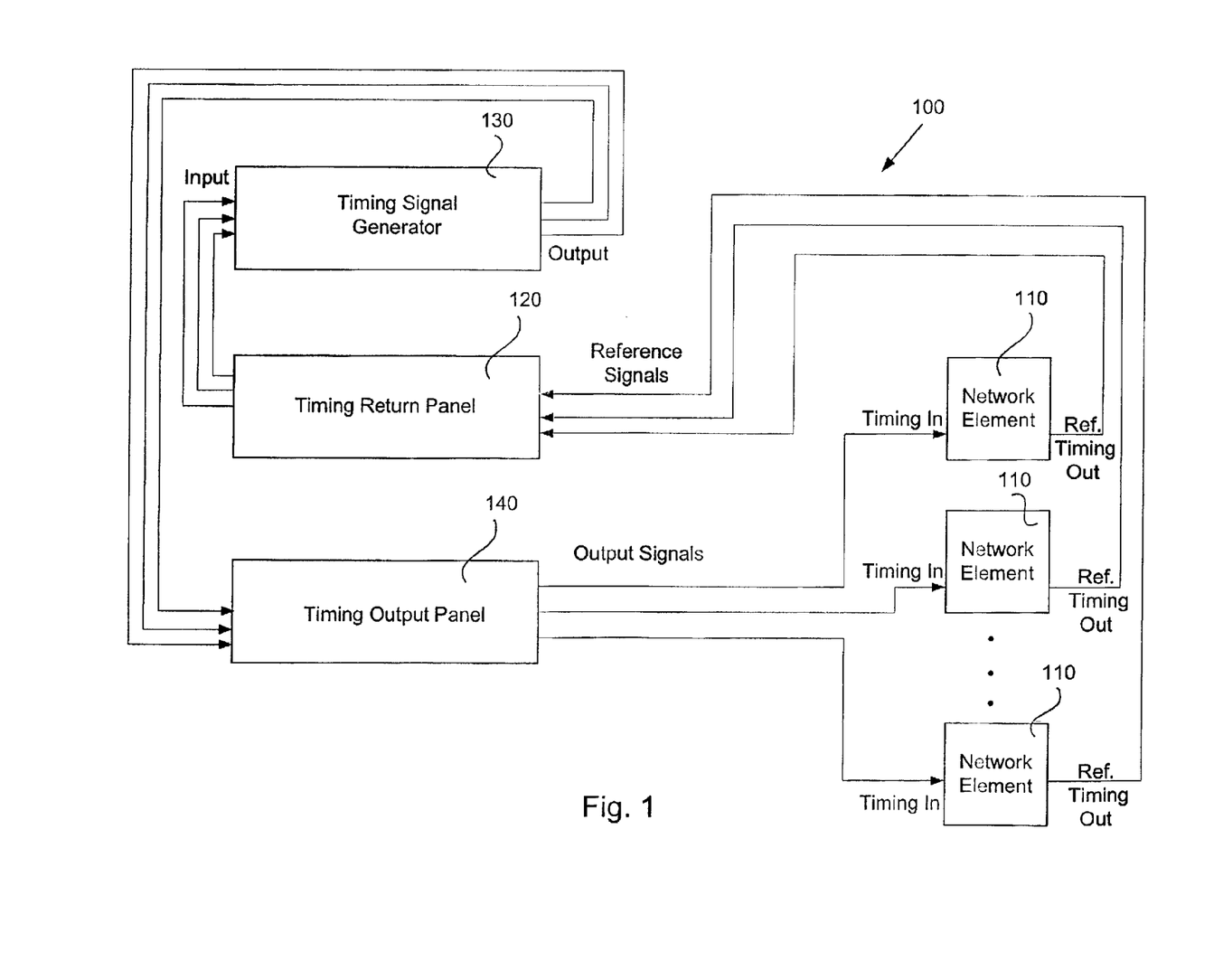
FIG. 1 is a diagram of an exemplary system in which panels consistent with the principles of invention may be implemented.

FIG. 1 is a diagram of an exemplary system 100 in which panels consistent with the principles of invention may be implemented. System 100 may include a number of network elements 110, a timing return panel 120, a timing signal generator 130, and a timing output panel 140. The network elements 110 each may include a communication interface (e.g., synchronous optical network (SONET), Ethernet, asynchronous transfer mode (ATM) or similar interfaces) and interface electronics (not shown) for controlling timing associated with the interface. The interface electronics in the network elements 110 may receive a synchronization signal at a timing input and may output one or more reference signals at a timing output. The synchronization signal may be used by the interface electronics to control the timing of the interface in the network element 110. The reference signal may reflect the synchronization signals generated elsewhere in the network. Although three network elements 110 are illustrated in FIG. 1, these may be representative of a larger number (e.g., 10, 20, etc.) of network elements, or there may be fewer network elements (e.g., 2) in an alternate implementation.

The timing return panel 120 may be configured to receive the reference signals from all of the network elements 110. The timing return panel 120 also may be configured to connect the reference signals from selected network elements 110 to the timing signal generator 130. In one implementation consistent with the present invention, the output signals and reference signals are digital signals corresponding to the industry-standard digital signal, level 1 (DS-1) communication standard. The invention, however, is equally applicable to other types of digital signals, and to analog and hybrid signals.

The timing signal generator 130 may be configured to receive a number of reference signals from the timing return panel 120. The timing signal generator 130 may use one reference signal from a chosen network element 110 among the reference signals as a basis for generation of standard timing signals. The timing signal generator 130 also may generate and output a number of identical synchronization signals from the reference signal. In this manner, the timing of all network elements 110 may be synchronized to the same standard.

The timing output panel 140 may be configured to receive the output signals from the timing signal generator 130. The timing output panel 140 also may be configured to connect the output signals to the network elements 110 as timing inputs. Exemplary implementations of the timing output panel 140, and the timing return panel 120, will be discussed in greater detail below.

Although FIG. 1 shows one input signal and one reference signal associated with each network element 110, in practice the network elements 110 may include primary and secondary inputs for timing signals as well as primary and secondary outputs for reference timing signals. Similarly, the timing signal generator 130 may include both primary and secondary outputs for timing signals. Such primary and secondary signals provide redundancy for the system 100, in the event of a failure in one of the network elements 110, or in a circuit card in, for example, the timing signal generator 130. Hence, although illustrated as single connections in FIG. 1, some or all of the connections among the components of system 100 may include a primary and one or more secondary connections.

TIMING RETURN PANEL

Figure 2A:
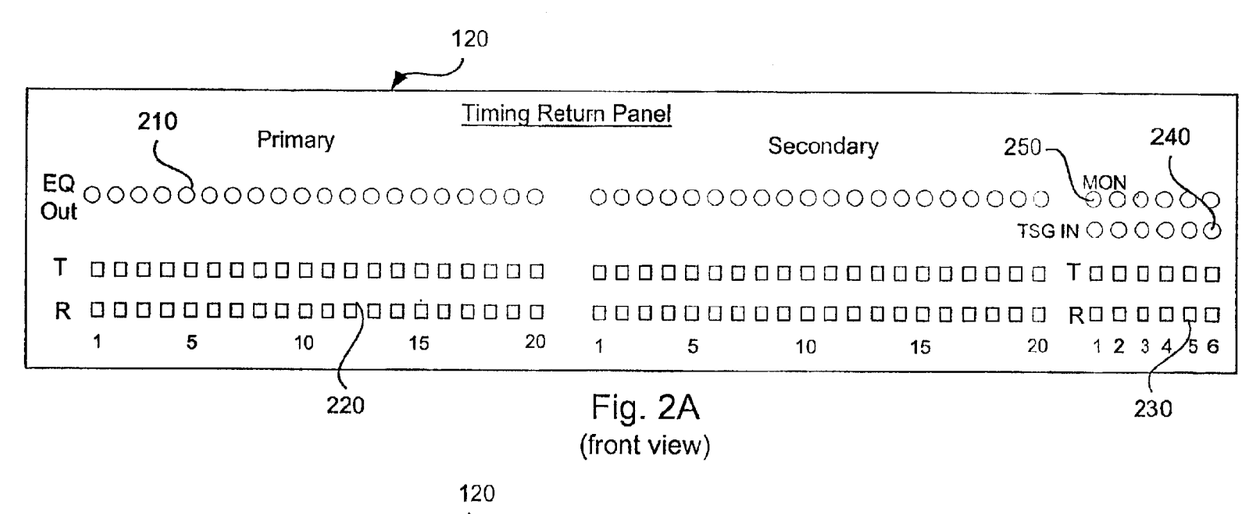
FIG. 2A is a front view of an exemplary timing return panel of FIG. 1 according to an implementation consistent with the principles of invention.

FIG. 2A is a front view of an exemplary timing return panel 120 according to an implementation consistent with the principles of invention. The front of the timing return panel 120 may include a row of equipment output (EQ Out) connectors 210, a row of tip and ring (T and R) connectors 220 where each vertical T and R pair constitutes one connector, a number of timing signal generator T and R connectors 230, a number of timing signal generator input (TSG In) connectors 240, and a number of monitor connectors 250. Although primary and secondary connectors are present, for example, within the row of EQ Out connectors 210, the primary and secondary connectors have similar electrical connections within the timing return panel 120. Accordingly, for ease of explanation these primary and secondary connectors will be described as a group (e.g., as the row of EQ Out connectors 210) in FIG. 2A and, where applicable, in the remaining FIGS. 2B–3B.

The EQ Out connectors 210 may include, for example, 20 primary and 20 secondary connectors that may be electrically connected to the respective reference timing outputs of 20 different network elements 110. The EQ Out connectors 210 may include standard Bantam type intrusive DSX-1 jacks, or any other type of connector that is suitable for temporarily connecting (e.g., patching) cables. The EQ Out connectors 210 may facilitate, for example, temporarily connecting (e.g., for maintenance or emergency signal restoration) the reference timing output signal from any network element 110 to the timing signal generator 130.

The T and R connectors 220 may include, for example, 20 pairs of primary and 20 pairs of secondary connectors that may be electrically connected to the respective reference timing outputs of 20 different network elements 110. The T and R connectors 220 also may be electrically connected to corresponding EQ Out connectors 210 within the timing return panel 120. The T and R connectors 220 may include wire wrap pins, or any other type of connector that is suitable for permanently connecting points on the return panel 120. The T and R connectors 220 may facilitate, for example, permanently connecting the reference timing output signal from one or mote network elements 110 to inputs of the timing signal generator 130 (e.g., via T and R connectors 230 and 270).

The timing signal generator T and R connectors 230 may include, for example, six pairs of connectors that may be respectively connected to as many as six corresponding inputs of the timing signal generator 130. Each vertical T and R pair constitutes one connector 230. The T and R connectors 230 may include wire wrap pins, or any other type of connector that is suitable for connecting points on the timing return panel 120. The T and R connectors 230 may facilitate, for example, permanently connecting the reference timing output signal from one or more network elements 110 (via T and R connectors 220) to inputs of the timing signal generator 130. Such connections may be made by, for example, wrapping wires around and between respective T and R connectors 220 and 230, as will be appreciated by those skilled in the art. Although up to six network elements 110 may be connected to the timing signal generator 130 by the T and R connectors 230 in FIG. 2A, more or fewer connectors 230 may be used depending on an input configuration of the timing signal generator 130.

Figure 2B:
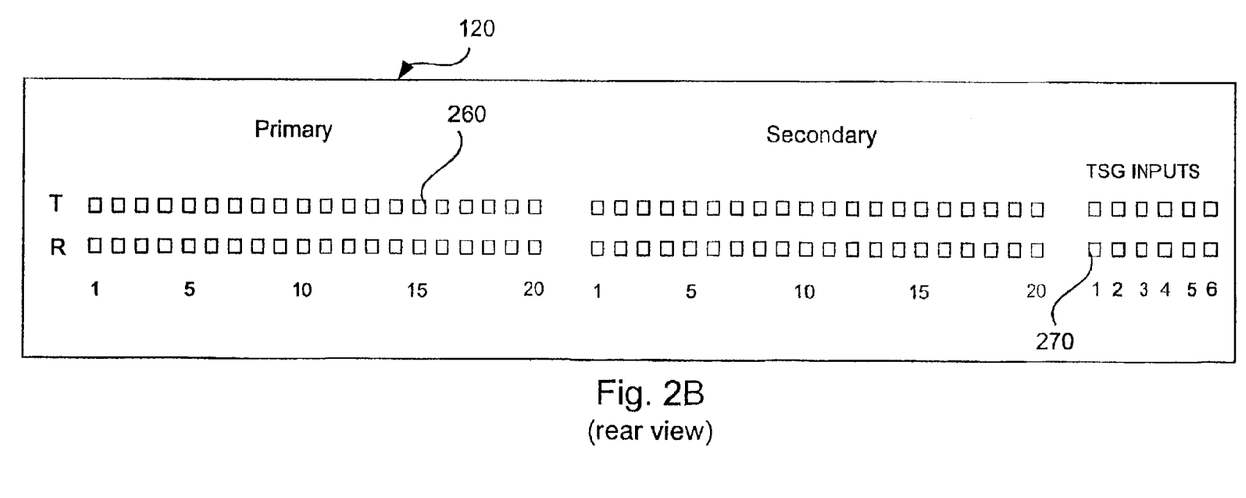
FIG. 2B is a rear view of an exemplary timing return panel of FIG. 1 according to an implementation consistent with the principles of invention.
Figure 2C:
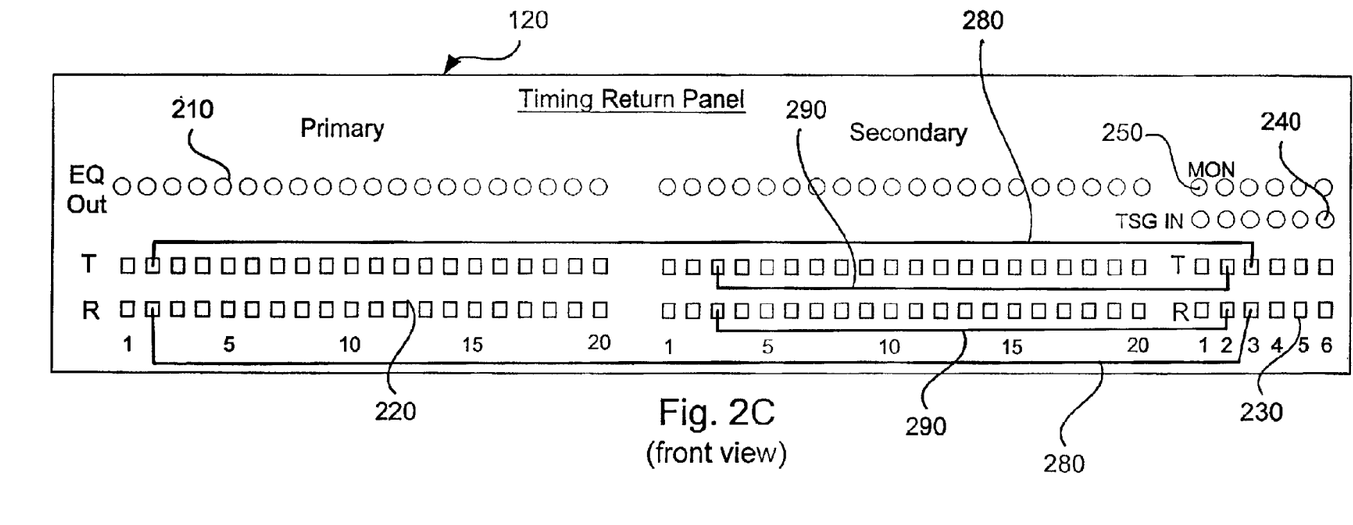
FIG. 2C is a front view of the exemplary timing return panel of FIG. 2A illustrating wire-wrap connections according to an implementation consistent with the principles of invention.

FIG. 2C is a front view of the exemplary timing return panel 120 illustrating exemplary wire-wrap connections between respective T and R connectors 220 and 230. One pair of wires 280 connects, for example, the second pair of primary T and R connectors 220 to the third-pair of T and R connectors 230. Another pair of wires 290 connects, for example, the third pair of secondary T and R connectors 220 to the second pair of T and R connectors 230. Because the timing signal generator 130 need only receive a reference signal from one of the network elements 110 to generate, for example, 20 output signals, only one pair of T and R connectors 220 need be connected to one pair of T and R connectors 230. The timing signal generator 130 may have up to, for example, six inputs for receiving reference signals from the network elements 110, hence the presence of six corresponding T and R connectors 230. Those skilled in the timing panel art will appreciate that the number and location of permanent wire wrap connections (e.g., 280, 290) between T and R connectors 220 and 230 will vary depending on the configuration of system 100.

Though certain connections have been described as "permanent" and others have been described as "temporary," it is recognized that, for example, wire-wrap connections may be frequently changed, or patch cables may be left in place indefinitely. What is intended by "permanent" and "temporary" herein is the differentiation between lengths of use of different connectors in practice. Thus, the wire wrap connections to, for example, T and R connectors 220 are denoted as "permanent," because they are typically fixed upon initial configuration of system 100, and left alone thereafter. Such wire wrap connections, for example, may be moved upon any subsequent, lasting reconfigurations of system 100, and may still be denoted as "permanent." By contrast, patch or testing connections to, for example, EQ Out connectors 210 are denoted as "temporary," because such connections are typically made to perform restorative or testing connections, which are usually of shorter duration than the "permanent" connections above. Hence, as used herein, "permanent" and "temporary" are intended as terms of relative degree, and not as absolutes.

Returning to FIG. 2A, the TSG In connectors 240 may include, for example, six connectors that may be electrically connected to the corresponding inputs of the timing signal generator 130. The TSG In connectors 240 also may be electrically connected to the respective timing signal generator T and R connectors 230 within the timing return panel 120. The TSG In connectors 240 may include standard Bantam type intrusive DSX-1 jacks, or any other type of connector that is suitable for temporarily connecting (e.g., patching) cables. The TSG In connectors 240 may facilitate, for example, temporarily connecting (e.g., for maintenance or emergency signal restoration) one input of the timing signal generator 130 to another network element 110 (via EQ Out connectors 210).

The monitor connectors 250 may include, for example, six connectors that may be electrically connected to the corresponding TSG In connectors 240 (and the inputs of the timing signal generator 130) via resistors within the timing return panel 120 to provide high impedance monitoring capability while circuits are in service. The monitor connectors 250 may include standard Bantam type non-intrusive DSX-1 jacks, or any other type of connector that is suitable for temporarily connecting (e.g., monitoring) cables. The monitor connectors 250 may facilitate, for example, examining inputs to the timing signal generator 130 while the system 100 is in use.

The timing return panel 120, consistent with an exemplary implementation of the invention, may be mounted in a standard 19" relay rack within 1–2 vertical mounting spaces. In one implementation consistent with the present invention, the T and R connectors 220 and 230, such as wire wrap pins, are placed below the EQ Out connectors 210, TSG In connectors 240, and monitor connectors 250 on the front of the timing return panel 120 to prevent cross connect wires from interfering with the jacks. The timing return panel 120 may advantageously reduce human error by minimizing manual wiring and may facilitate the emergency restoration of reference signals via front patching capability. Further the spatial separation of the primary signals and the secondary signals ensures primary and secondary signal diversity within the system 100.

FIG. 2B is a rear view of the exemplary timing return panel 120 according to an implementation consistent with the principles of invention. The rear of the timing return panel 120 may include a row of tip and ring (T and R) connectors 260 and a number of timing signal generator T and R connectors 270. The T and R connectors 260 may be directly connected to reference timing signals from the network elements 110, typically using 1-pair shielded cables. Similarly, the timing signal generator T and R connectors 270 may be directly connected to inputs of the timing signal generator 130.

The T and R connectors 260 may include, for example, 20 pairs of primary and 20 pairs of secondary connectors that may be directly connected to the respective reference timing outputs of 20 different network elements 10. The T and R connectors 260 also may be electrically connected to respective contact points of the EQ Out connectors 210 and the T and R connectors 220 within the timing return panel 120. Each vertical T and R pair constitutes one connector 260. The T and R connectors 260 may include feed-through wire wrap pins, or any other type of connector that is suitable for permanent connection with one or more network elements 110.

The timing signal generator T and R connectors 270 may include, for example, six pairs of connectors that may be directly connected to respective inputs of the timing signal generator 130. The T and R connectors 270 also may be electrically connected to respective contact points of the TSG In connectors 240 and the T and R connectors 230 within the timing return panel 120. The T and R connectors 270 also may be connected to respective contact points of the monitor connectors 250 via resistors within the timing return panel 120. Each vertical T and R pair constitutes one connector 270. The T and R connectors 270 may include feed-through wire wrap pins, or any other type of connector that is suitable for permanent connection with the timing signal generator 130. In one implementation consistent with the present invention, all internal connections within the timing return panel 120 may employ shielded wire, and one or more termination points (not shown) may be provided for chassis and/or signal ground connections. In another implementation consistent with the present invention, all internal connections within the timing return panel 120 may employ unshielded wire.

TIMING OUTPUT PANEL

Figure 3A:
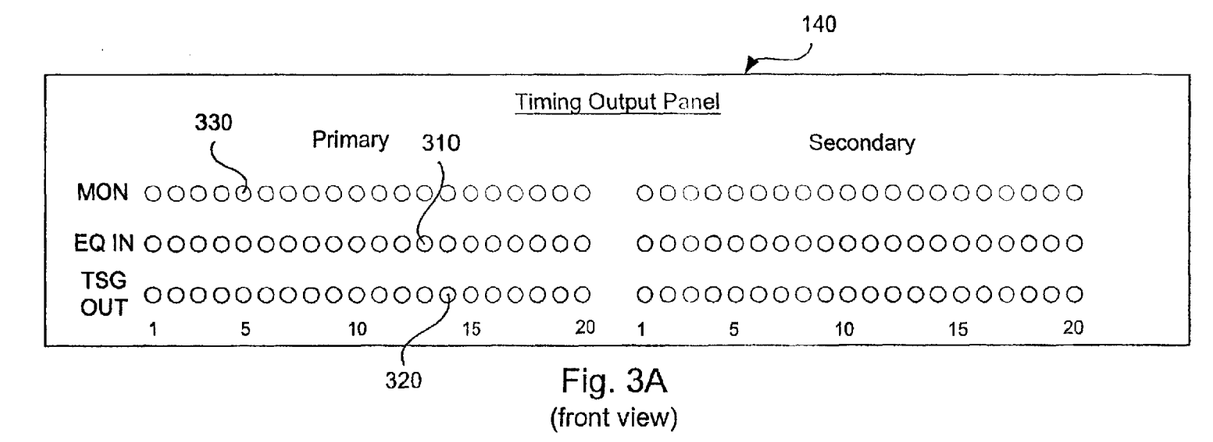
FIG. 3A is a front view of an exemplary timing output panel of FIG. 1 according to an implementation consistent with the principles of invention.

FIG. 3A is a front view of an exemplary timing output panel 140 according to an implementation consistent with the principles of invention. The front of the timing output panel 140 may include a row of equipment input (EQ In) connectors 310, a row of timing signal generator output (TSG Out) connectors 320, and a row of monitor connectors 330.

The EQ In connectors 310 may include, for example, 20 primary and 20 secondary connectors that may be electrically connected to the respective timing inputs of 20 different network elements 110. The EQ In connectors 310 may include standard Bantam type intrusive DSX-1 jacks, or any other type of connector that is suitable for temporarily connecting (e.g., patching) cables. The EQ In connectors 310 may facilitate, for example, temporarily connecting (e.g., for maintenance or emergency signal restoration) another output from the timing signal generator 130 to a network element 110.

The TSG Out connectors 320 may include, for example, 20 primary and 20 secondary connectors that may be electrically connected to the respective outputs of the timing signal generator 130. The TSG Out connectors 320 may include standard Bantam type intrusive DSX-1 jacks, or any other type of connector that is suitable for temporarily connecting (e.g., patching) cables. The TSG Out connectors 320 may facilitate, for example, testing the synchronization signals that are output from the timing signal generator 130.

The monitor connectors 330 may include, for example, 20 primary and 20 secondary connectors that may be connected via resistors to the respective outputs of the timing signal generator 130. The monitor connectors 330 mall include standard Bantam type intrusive DSX-1 jacks, or any other type of connector that is suitable for temporarily connecting (e.g., patching) cables. The monitor connectors 330 may facilitate, for example, high impedance monitoring or examining of output signals from one or more channels of the timing signal generator 130.

The timing output panel 140, consistent with an exemplary implementation of the invention, may be mounted in a standard 19" relay rack within 1–2 vertical mounting spaces. The timing output panel 140 may advantageously reduce human error by minimizing manual wiring and may facilitate the emergency restoration of synchronization signals via front patching capability. Further the spatial separation of the primary signals and the secondary signals ensures primary and secondary signal diversity within the system 100.

Figure 3B:
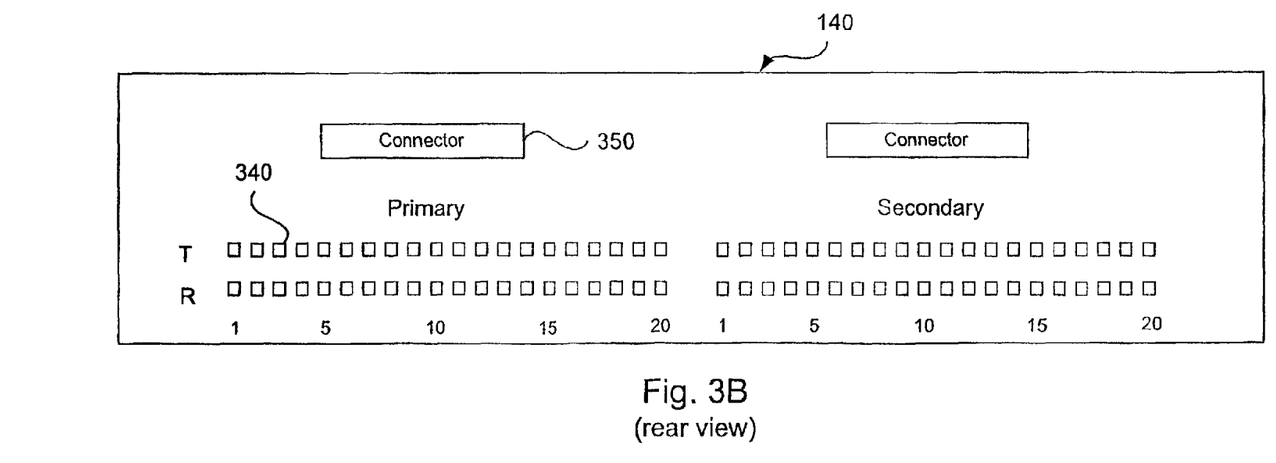
FIG. 3B is a rear view of an exemplary timing output panel of FIG. 1 according to an implementation consistent with the principles of invention.

FIG. 3B is a rear view of the exemplary timing output panel 140 according to an implementation consistent with the principles of invention. The rear of the timing output panel 140 may include a row of tip and ring (T and R) connectors 340 and a timing signal generator connector 350. The T and R connectors 340 may be directly connected to timing inputs of the network elements 110, typically using 1-pair shielded cables. Similarly, the timing signal generator connector 350 may be directly connected to outputs of the timing signal generator 130.

The T and R connectors 340 may include, for example, 20 pairs of primary and 20 pairs of secondary connectors that may be directly connected to the respective timing inputs of 20 different network elements 110. The T and R connectors 340 also may be electrically connected to respective contact points of the EQ In connectors 310 within the timing output panel 140. Each vertical T and R pair constitutes one connector 340. The T and R connectors 340 may include feed-through wire wrap pins, or any other type of connector that is suitable for permanent connection with one or more network elements 110.

The timing signal generator connector 350 may include, for example, primary and secondary connectors with multiple pins (not shown) that may be directly connected to outputs of the timing signal generator 130. The connector 350 also may be electrically connected to contact points of the TSG Out connectors 320 within the timing output panel 140. The connector 350 also may be connected to T and R connectors 340 within the timing output panel 140. The connector 350 also may be respectively connected to contact points of the monitor connectors 330 via resistors within the timing output panel 140. The connector 350 may include a 50-pin amphenol-type connector, or any other type of connector that is suitable for permanent connection with the timing signal generator 130. In one implementation consistent with the present invention, all internal connections within the timing output panel 140 may employ shielded wire, and one or more termination points (not shown) may be provided for chassis and/or signal ground connections. In another implementation consistent with the present invention, all internal connections within the timing output panel 140 may employ unshielded wire.

The details of the timing signal generator 130 have not been extensively described herein, to avoid undue obscuration of the principles of the invention. One of ordinary skill in the art will appreciate that any conventional timing signal generator that receives a number of reference timing input signals and provides a number of output timing signals may be used in implementations of the present invention.

Figure 4:
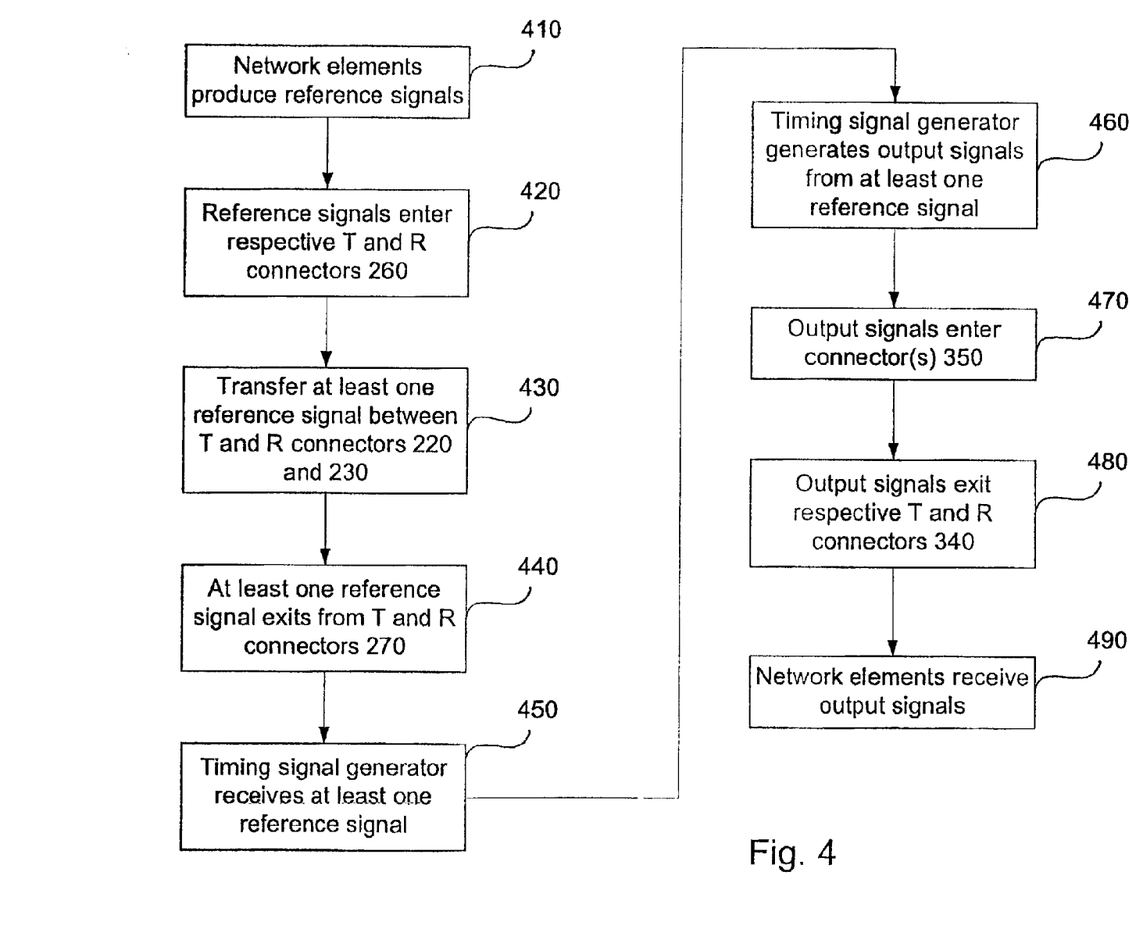
FIG. 4 is a flow chart illustrating signal flow according to an implementation of the system of FIG. 1.

FIG. 4 is a flow chart illustrating signal flow according to an implementation of the system 100 that includes the timing return panel 120 and the timing output panel 140 shown in FIGS. 2A–3B. The network elements 110 may produce a number of reference timing signals, which are connected to the timing return panel 120 [act 410]. T and R connectors 260 on the rear of the timing return panel 120 may receive the reference timing signals from the network elements 110 [act 420]. At least one of the reference timing signals may be transferred from the T and R connectors 220 on the front of the timing return panel 120 (which are electrically connected to the T and R connectors 260) to the T and R connectors 230 on the front of the timing return panel 120 (which are electrically connected to the T and R connectors 270 on the rear on the timing return panel 120) [act 430]. The reference timing signals may be transferred by wires (e.g., 280, 290) on the front of the timing return panel 120. The transferred reference timing signals may exit the timing return panel 120 from T and R connectors 270 on the rear of the panel [act 440].

The timing signal generator 130 may receive the reference timing signals from the timing return panel 120 [act 450]. The timing signal generator 130 may generate a number of output signals from the reference timing signals that it receives [act 460]. These output signals are transferred to connector 350 on the rear of timing output panel 140 [act 470]. As described previously, connector 350 and T and R connectors 340 may be internally connected within the timing output panel 140. The output signals may exit the timing output panel 140 from the T and R connectors 340 on the rear of the panel [act 480]. The network elements 110 may receive the output signals at their respective input ports [act 490].

The above-described timing return panel 120 and timing output panel 140 may advantageously save rack space relative to conventional panels. In an exemplary implementation, the system 100 may utilize one timing return panel 120 and six timing output panels 140 to provide a certain capacity. Such a configuration may use a single distribution rack for the panels. By contrast, conventional panels configured to provide similar capacity would require two distribution racks and a corresponding amount of space. The conventional panels typically require a larger amount of wire wrapping. Hence, the timing return panel 120 and the timing output panel 140 may advantageously save space and reduce the likelihood of wire wrapping errors.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while the timing return and output panels 120 and 140 have been described in the context of distributing synchronization signals, the panels may be used to distribute other types of DS-1 signals, or analog signals. Further, it is contemplated that the number, type, and spacing of the connectors on the panels may be varied by those skilled in the art in accordance with various design criteria.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A panel, comprising:
   a first side, including:
      at least one first connector configured to connect to synchronization electronics and receive a plurality of signals from the synchronization electronics, the at least one first connector including an integrated connector having a number of contact points therein, and
      a plurality of second connectors respectively configured to connect to a plurality of network devices and deliver the plurality of signals to the plurality of network devices; and
   a second side opposite from the first side, including:
      a plurality of third connectors respectively coupled to at least one of the at least one first connector and the plurality of second connectors and configured to provide temporary connection to at least one of the synchronization electronics and the plurality of network devices.

2. The panel of claim 1, wherein the second connectors include wire wrap pins.

3. The panel of claim 1, wherein the at least one first connector is electrically connected to the plurality of second connectors to deliver the plurality of signals from the electrical equipment to the plurality of network devices.

4. The panel of claim 1, wherein the plurality of third connectors includes:
   a plurality of fourth connectors electrically connected to the at least one first connector and configured to provide temporary connections from the electrical equipment.

5. The panel of claim 4, wherein the plurality of third connectors further includes:
   a plurality of fifth connectors electrically connected to the plurality of second connectors and configured to provide temporary connections to the plurality of network devices from the plurality of fourth connectors.

6. The panel of claim 4, wherein the plurality of third connectors further includes:
   a plurality of sixth connectors electrically connected to the plurality of second connectors via a respective plurality of resistors and configured to provide high impedance connections to the plurality of network devices.

7. The panel of claim 1, wherein the at least one first connector and the plurality of second connectors each includes a primary group of connectors and a secondary group of connectors for connecting primary and secondary groups of signals between the electrical equipment and the plurality of network devices.

8. A timing output panel, comprising:
   a rear portion, including:
      a plurality of network connectors respectively configured to connect to a plurality of network elements, and
      at least one timing connector connected to the plurality of network connectors and configured to connect to synchronization electronics, the at least one timing connector including a unitary connector having multiple pins corresponding to a number of signals from the synchronization electronics; and
   a front portion, including:
      a plurality of equipment jacks corresponding to and electrically connected to the plurality network connectors, the equipment jacks facilitating temporary connection of cables for testing or patching signals to the network elements, and
      a plurality of timing jacks corresponding to and electrically connected to the at least one timing connector, the timing jacks facilitating temporary connection of cables for testing the synchronization electronics or patching to the equipment jacks.

9. The timing output panel of claim 8, wherein the network connectors include wire wrap pins.

10. The timing output panel of claim 8, wherein the front portion further includes:
    a plurality of monitor jacks electrically connected to the plurality of equipment jacks by a respective plurality of resistors.

11. The timing output panel of claim 8, wherein the network connectors include:
    a primary group of network connectors, and
    a secondary group of network connectors that are spatially separated from the primary group of network connectors.

12. The timing output panel of claim 8, wherein the at least one timing connector include:
    a primary timing connector, and
    a secondary timing connector that is spatially separated from the primary timing connector.

13. The timing output panel of claim 8, wherein the equipment jacks include:
    a primary group of equipment jacks, and
    a secondary group of equipment jacks that are spatially separated from the primary group of equipment jacks.

14. The timing output panel of claim 10, wherein the equipment jacks, the timing jacks, and the monitor jacks include an identical type of connector.

15. A panel, comprising:

a rear portion, including:
- means for connecting to a plurality of network elements, and
- means for connecting to synchronization electronics; and a front portion, including:
- means for testing at least one of the plurality of network elements and the synchronization electronics, wherein
  - the means for connecting to synchronization electronics includes at least one connector including an integrated connector having a number of contact points therein.

16. The panel of claim 15, wherein the front portion further includes:
- means for monitoring signals associated with the synchronization electronics.

17. The panel of claim 15, wherein the means for testing includes:
- means for removably accepting a patch cable.

18. The panel of claim 15, wherein the means for connecting to the plurality of network elements includes:
- means for perpetually receiving and holding one or more connection wires.

19. A system, comprising:
- a plurality of network elements, each network element respectively receiving an input timing signal;
- a timing signal generator configured to generate the synchronization signals for the plurality of network elements; and
- a timing output panel connected between the plurality of network elements and the timing signal generator, the timing output panel including:
  - at least one first connector configured to receive the output signals from the timing signal generator,
  - a plurality of second connectors configured to send the output signals to the plurality of network elements, and
  - a plurality of third connectors spaced apart from the first and second connectors and configured to facilitate testing of the output signals and patching of the output signals.

20. A timing output panel comprising:

a first side, including:
- a plurality of first connectors configured to be connected to respective reference timing inputs of network elements, the plurality of first connectors including a plurality of primary first connectors and a plurality of secondary first connectors, the first connectors including standard Bantam type intrusive DSX-1 jacks for temporary connections;
- a plurality of second connectors, the second connectors being configured to connect to respective outputs of a timing signal generator, each of the second connectors including standard Bantam type intrusive DSX-1 jacks for temporary connections; and
- a plurality of monitor connectors, the monitor connectors including a plurality of primary monitor connectors and a plurality of secondary monitor connectors configured to be connected to respective outputs of the timing signal generator via resistors, the monitor connectors including standard Bantam type intrusive DSX-1 jacks for temporary connections; and a second side including:
- a plurality of tip and ring connectors configured be connected to one of the reference timing inputs of the network elements using 1-pair shielded cables and respective contact points of the first connectors within the timing output panel, the tip and ring connectors including feed-through wire wrap pins; and
- a primary and secondary timing signal generator connector, each of the timing signal generator connectors including a 50-pin amphenol-type connector configured to be connected to the outputs of the timing signal generator.

\* \* \* \* \*